US011962841B2

(12) United States Patent
Riepling

(10) Patent No.: US 11,962,841 B2
(45) Date of Patent: Apr. 16, 2024

(54) TELEVISION UPGRADE

(71) Applicant: ROKU, INC., San Jose, CA (US)

(72) Inventor: Eric Casten Riepling, Soquel, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/740,907

(22) Filed: May 10, 2022

(65) Prior Publication Data

US 2023/0370674 A1 Nov. 16, 2023

(51) Int. Cl.
*H04N 21/436* (2011.01)
*H04N 21/422* (2011.01)
*H04N 21/4363* (2011.01)
(52) U.S. Cl.
CPC . *H04N 21/43615* (2013.01); *H04N 21/42225* (2013.01); *H04N 21/43635* (2013.01)
(58) Field of Classification Search
None
See application file for complete search history.

(56) References Cited

U.S. PATENT DOCUMENTS

2018/0203575 A1* 7/2018 Kwon .................. H04N 21/485

\* cited by examiner

*Primary Examiner* — Samira Monshi
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for upgrading one or more display device hardware components. In one embodiment, as new television hardware components become available, the technology described herein allows replacement of original hardware components by external hardware components implemented as an add-in card, stick or equivalent circuitry and operational instructions. In some embodiments, the technology described herein may implement an application programming interface (API) that exposes hardware of a new external device communicatively coupled to the display device (e.g., television) to take control of one or more components of an existing internal system. Various interface technologies, such as HDMI and USB, may be used to connect the external hardware to the internal systems.

17 Claims, 8 Drawing Sheets

```
┌─────────────────────────────────────────────────────────────┐
│  ESTABLISH COMMUNICATION OF INTERNAL AND EXTERNAL HARDWARE  │
│                         DEVICES                             │
│                                                         602 │
└─────────────────────────────────────────────────────────────┘
                              │
                              ▼
┌─────────────────────────────────────────────────────────────┐
│     IMPORT INTERNAL HARDWARE SETTINGS TO EXTERNAL HARDWARE  │
│                                                         604 │
└─────────────────────────────────────────────────────────────┘
                              │
                              ▼
┌─────────────────────────────────────────────────────────────┐
│              REQUEST CONTROL OF INTERNAL CONTROLLER         │
│                                                         606 │
└─────────────────────────────────────────────────────────────┘
                              │
                              ▼
┌─────────────────────────────────────────────────────────────┐
│         RECEIVE HARDWARE CALLS FROM INTERNAL CONTROLLER     │
│                                                         608 │
└─────────────────────────────────────────────────────────────┘
                              │
                              ▼
┌─────────────────────────────────────────────────────────────┐
│        COMMUNICATE MEDIA DEVICE COMMANDS TO THE DISPLAY DEVICE │
│                                                         610 │
└─────────────────────────────────────────────────────────────┘
                              │
                              ▼
┌─────────────────────────────────────────────────────────────┐
│  MANAGE, AT LEAST IN PART, THE DISPLAY DEVICE USING THE MEDIA│
│                       DEVICE COMMANDS                       │
│                                                         612 │
└─────────────────────────────────────────────────────────────┘
```

FIG. 6

TELEVISION UPGRADE

BACKGROUND

Field

This disclosure is generally directed to display screen technology, and more particularly to upgrading one or more television components.

Background

After a media device (e.g., a television) is purchased by a customer, methods for improving the experience or performance of the television are generally limited to software only updates. For example, as television and communication technology evolves, existing hardware may be unable to connect new physical protocols, decode certain streams that require more processing power or add new features that are not part of the original design or build.

SUMMARY

Provided herein are system, apparatus, article of manufacture, method and/or computer program product embodiments, and/or combinations and sub-combinations thereof, for upgrading existing display device hardware components. The technology as described herein, in some embodiments, may be configured to improve television performance (e.g., usability, speed, streaming speed, image quality, sound quality, etc.). In some embodiments, the technology may be applied broadly to any configurable aspect of streaming video and audio.

BRIEF DESCRIPTION OF THE FIGURES

The accompanying drawings are incorporated herein and form a part of the specification.

FIG. 6 illustrates a process diagram of adding one or more hardware components, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for upgrading one or more display device hardware components. For example, as new television hardware components become available, the technology described herein allows replacement of original hardware components by external hardware components implemented as an add-in card, stick or equivalent circuitry and operational instructions.

In some embodiments, the technology described herein may implement an application programming interface (API) that exposes hardware of a new external device communicatively coupled to the display device (e.g., television) to take control of one or more components of an existing internal system.

In various embodiments, the technology described herein will replace one or more existing internal hardware components of a display device with new corresponding external hardware components, add one or more external hardware components that will work in conjunction with existing internal hardware components or add new functionality to the display device with one or more new external hardware components.

In some embodiments, the technology described herein may also be configured with a new or upgraded Operating System (OS) in conjunction with the new external hardware components.

In some embodiments, the technology described herein may be implemented by forwarding or rerouting of existing Hardware Abstraction Layer (HAL) messages and/or data from existing peripherals to a new external hardware device.

In some embodiments, the technology described herein may implement Peripheral Abstraction Layer (PAL) APIs. For example, one or more components of the original hardware APIs may be implemented as peripherals (using PAL APIs) based on an underlying Hardware Abstraction Layer (HAL).

Figure 1:
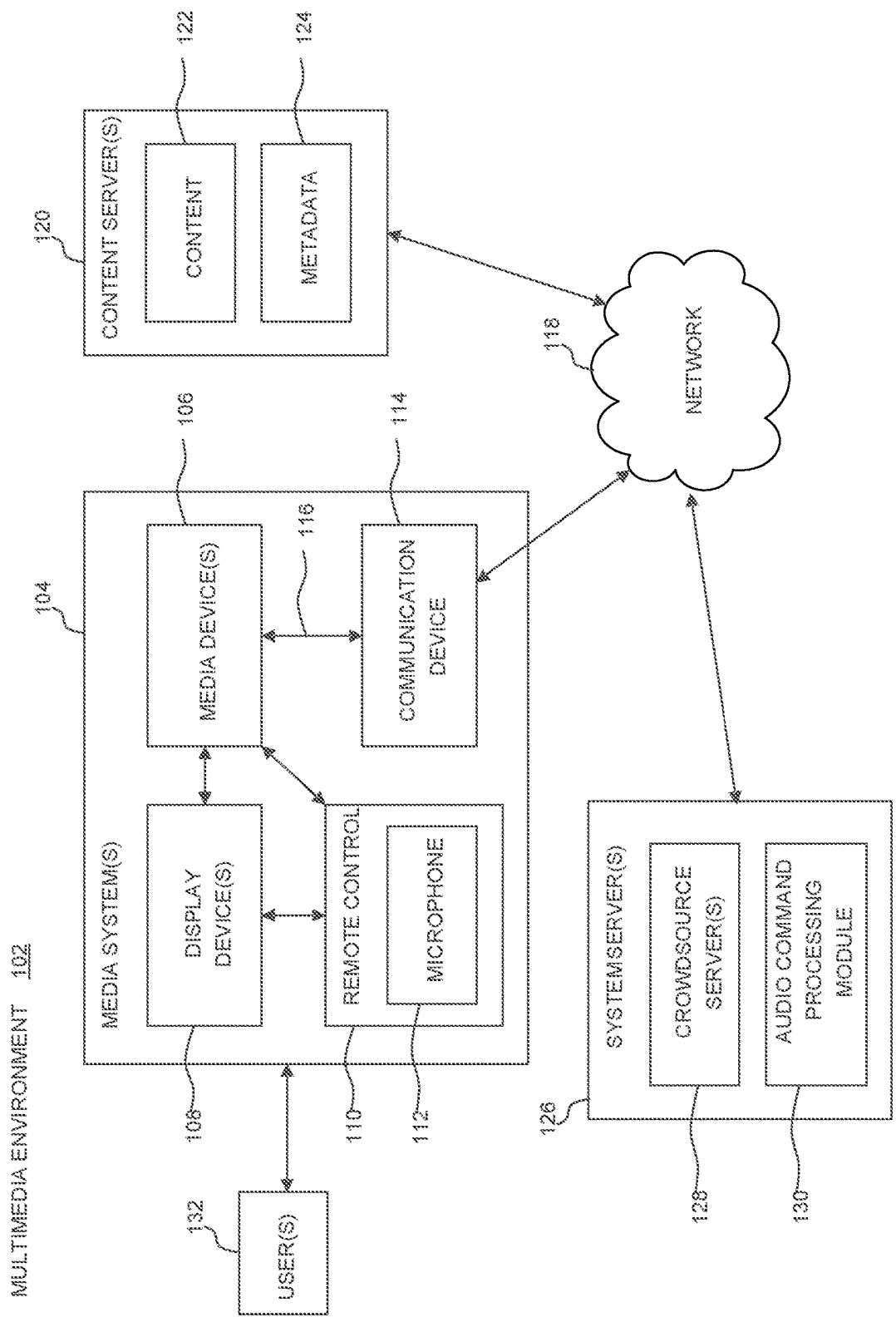
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, touch screen, smart phone, tablet, wearable (such as a watch or glasses), virtual reality (VR) headset, appliance, internet of things (IoT) device, automotive display, gaming display, heads-up display (HUD), and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming's of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
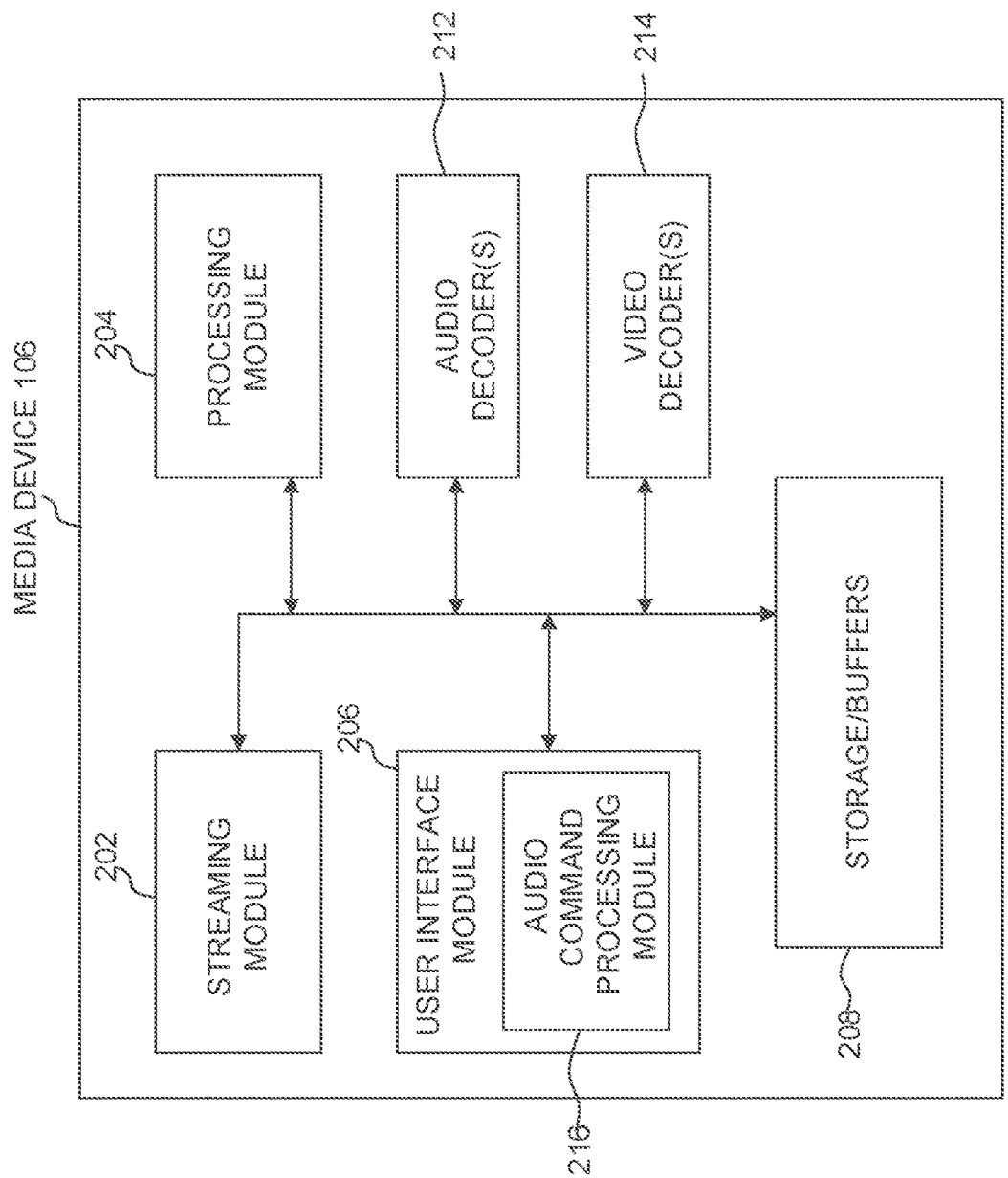
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206.

As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Display Device Upgrades

The technology as described herein, in some embodiments, may be configured to upgrade internal display device (e.g., television) hardware components for both streaming and non-streaming video and audio. In these embodiments, the technology may be applied broadly to any configurable aspect of a hardware replacement process. Display device 108 may be a monitor, television (TV), computer, touch screen, smart phone, tablet, wearable (such as a watch or glasses), virtual reality (VR) headset, appliance, internet of things (IoT) device, automotive display, gaming display, heads-up display (HUD), and/or projector, to name just a few examples.

Figure 3A:
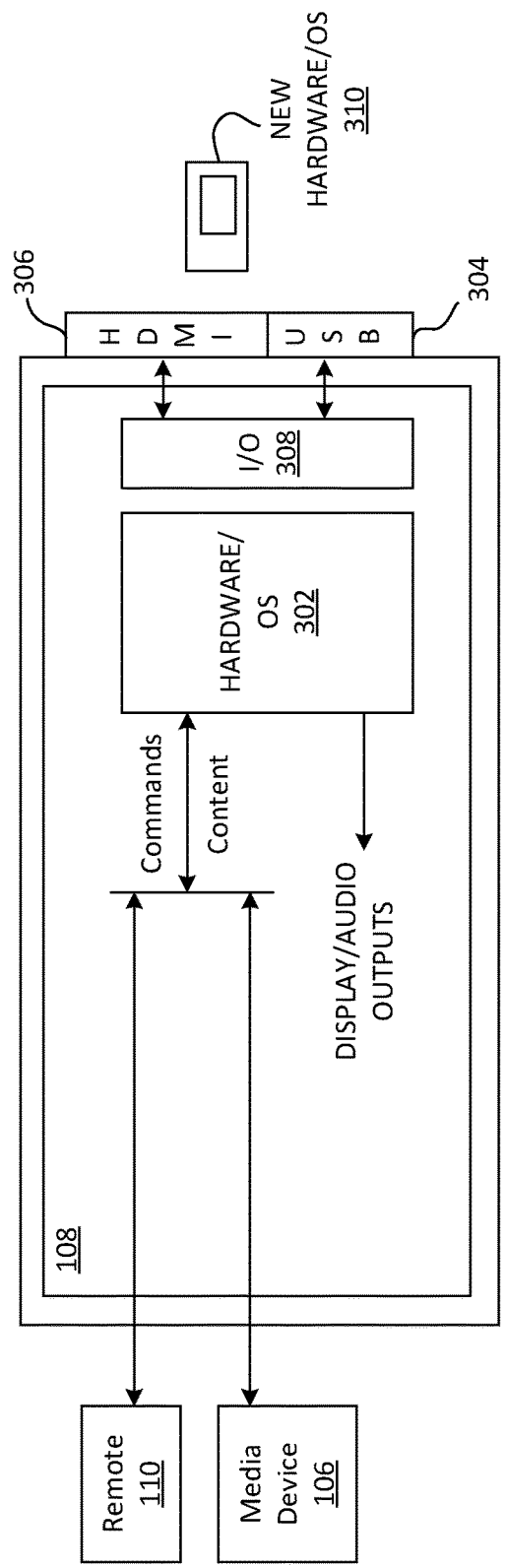
FIG. 3A illustrates a block diagram of a display device without a hardware upgrade device connected, according to some embodiments.
Figure 3B:
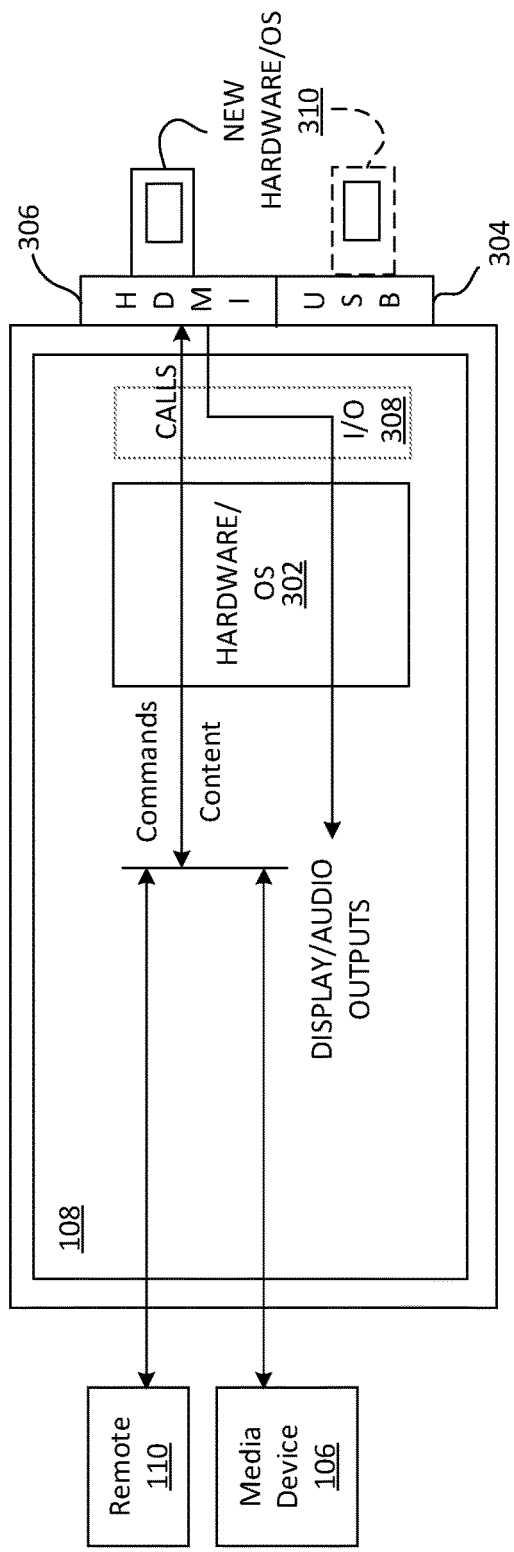
FIG. 3B illustrates a block diagram of a display device with a hardware upgrade device connected, according to some embodiments.

FIGS. 3A and 3B illustrate a block diagram of two configurations of display device 108 with original hardware 302, according to some embodiments. Original hardware 302 may be implemented by processing logic that can comprise hardware (e.g., system on a chip (SOC), circuitry, dedicated logic, programmable logic, microcode, memory, etc.) and further include software (e.g., instructions executing on a processing device). In one non-limiting example embodiment, a processing device of original hardware 302 will receive instructions from an operating system (OS). An operating system is system software that manages the computer hardware, software resources, and provides common services for computer programs, such as streaming functionality. Example hardware is further described in association with FIG. 4. It is to be appreciated that not all components may be needed to perform the disclosure provided herein. Further, some of the components described may include operational processes that may be performed simultaneously, or in a different order than described for FIGS. 3A and 3B, as will be understood by a person of ordinary skill in the art.

The technology described may implement, for example, a television upgrade by connecting new hardware 310 through existing display device 108 ports USB 304 or HDMI 306. As with the original hardware 302, in one non-limiting example embodiment, new hardware 310 is configured to receive instructions from an operating system (OS). This OS may be the same as an existing OS associated with the original hardware 302, be an upgraded OS or be a new OS without departing from the scope of the technology disclosed herein. While the embodiments disclosed are directed to plug-in ports located on an external surface of display device 108, any known or future port or interface may implement the technology described herein, including wireless interfaces, without departing from the scope of the technology described herein.

The new hardware 310 may be configured in multiple embodiments (see FIGS. 5A-5D). In one embodiment, the new hardware replaces one or more hardware components of the display device original hardware. For example, the new hardware may be a new external tuner that replaces an original internal tuner. The terms "new hardware", "external hardware", "new hardware components", "external computer device", "external card", "external stick" all refer to external hardware replacements, hardware upgrades or new functional hardware components as described throughout this disclosure.

In some embodiments, the new hardware operates in conjunction with the display device original internal hardware. In this embodiment, the original and new hardware may take responsibility for specific tasks or share tasks. In one non-limiting example, the original hardware may retain display driver responsibility. A display driver is software that allows the operating system to work with the graphics hardware. In another non-limiting example, the original hardware may retain video and audio routing from source to display or to speakers. In another non-limiting example, the old and new hardware share WiFi responsibilities. In another non-limiting example, the new hardware can generate new display drivers.

In some embodiments, the new hardware implements new functionality not previously available to the display device. For example, the new hardware includes a disco ball controller not previously available to the display device. In another example, the new hardware can process new data formats or new display or audio standards.

Referencing FIG. 3A and FIG. 3B, Universal Serial Bus (USB) 304 is an industry standard that establishes specifications for cables, connectors and protocols for connection, communication and power supplies (interfacing) between computers, peripherals and other computers. A Consumer Electronics Control (CEC) capability allows USB devices to control each other when necessary and allows a user to operate multiple devices with one handheld remote control device. A broad variety of USB hardware exists, including many different connector types, of which USB-C is the most recent. However, the specific USB connector type does not limit the technology as described herein. Current and future port or interface standards may be substituted without departing from the scope of technology described herein.

High-Definition Multimedia Interface (HDMI) 306 is a proprietary audio/video interface for transmitting uncompressed video data and compressed or uncompressed digital audio data from an HDMI-compliant source device, such as a display controller, to a compatible computer monitor, video projector, digital television, or digital audio device.

HDMI implements the 861 standards, which define video formats and waveforms, transport of compressed and uncompressed audio, auxiliary data, and implementations of the Video Electronics Standards Association (VESA). A Consumer Electronics Control (CEC) capability allows HDMI devices to control each other when necessary and allows a user to operate multiple devices with one handheld remote control device. Several versions of HDMI have been developed and deployed since the initial release of the technology, but all use the same cable and connector. Other than improved audio and video capacity, performance, resolution and color spaces, newer versions have optional advanced features such as 3D, Ethernet data connection, and CEC extensions. However, specific HDMI connector types and standards do not limit the technology as described herein. Current and future connectors and standards may be substituted without departing from the scope of technology described herein.

In particular, the figures illustrate a display device 108 (e.g., television) with a card bay, shown as HDMI and USB ports, to receive a plug-in card or stick, such as new hardware card 310, the configuration of which is discussed further below. Display device 108 is operative with remote 110, which includes buttons and or voice input control. Alternatively, or in addition to, remote 110 may include home voice interface devices connected to the internet. The display device 108 is an example of a device that is capable of presenting audio and visual information. Such a device may also be commonly referred to as an audio/visual (A/V) device. Original hardware component 302 may be configured to interact with remote control 110 through commands. The remote control 110 can be any component, part, apparatus and/or method for controlling the media device 106 and/or display device 108. In an embodiment, the remote control 110 wirelessly communicates with the media device 106 or display device 108 using cellular, Bluetooth, infrared, etc., or any combination thereof.

Media device 106 may be a streaming media device, Digital Video Disc (DVD) or BLU-RAY device, audio/video playback device, cable box, and/or digital video recording device, to name just a few examples. For illustrative purposes only, media device 106 is shown communicating commands and content to/from the original hardware, but not connected. In some embodiments, media device 106 can be a part of, integrated with, operatively coupled to, and/or connected to its respective display device 108. In practice, the media device 106 may be connected to the display device 108 through the USB port 304, HDMI port 306, coaxial cable connections, wirelessly connected or other known or future connection arrangements. Connecting the new hardware to the display device automatic enables of the Universal Serial Bus (USB) CEC or HDMI CEC based on the connection of the media device to the display device through a respective USB or HDMI port.

Each media device 106 may be configured to communicate with a network via a communication device. The communication device may include, for example, a cable modem or satellite TV transceiver. The media device 106 may communicate with the communication device over a link, wherein the link may include wireless (such as WiFi) and/or wired connections.

An interface module 308 is also connected to the original hardware 302. In one non-limiting embodiment, the interface module 308 is communicatively coupled to a processor 402 (see FIG. 4). The interface module is a set of executable instructions stored in memory, which are executed by the processor 402. The interface module controls communications between the original hardware and the new hardware connected through the HDMI, USB or wireless ports or interfaces.

FIG. 3A shows the new hardware 310 in an unconnected state. However, FIG. 3B, illustrates when the new hardware 310 is operative with the display device 108. In some embodiments, the new hardware may operate as a master device, while the display device operates as a slave device (or peripheral device). Put another way, the new hardware 319 performs one or more functions originally performed by one or more components of the original hardware 302. Commands intended for the original hardware 302 are rerouted to the new hardware for processing. In one non-limiting example, control signals (e.g., commands) to the display device 108 may be supplied through interface (I/O) 308 to the new hardware 310 with CEC commands in the HDMI protocol (when new hardware 310 is connected to the HDMI port as shown in FIG. 3B). For instance, the new hardware 310 communicates with the original hardware (e.g., with an internal controller) with a call or pull operation over, for example, an internal HDMI CEC link. Alternatively, or in addition to, the display device forwards the command as a push over an internal HDMI CEC link to the new hardware 310. The new hardware 310 may then provide the appropriate command back to the display device 108 via the HDMI CEC link. While described for commands, display and audio signals may be generated or controlled by the new hardware in a similar fashion. In one non-limiting example, a media device 106 connected to the display device may be controlled by the new hardware 310. Alternatively, or in addition to, the original hardware receives media content for play on display device 108 and forwards the media content to internal display and audio device drivers for subsequent display with associated audio based, at least in part, on commands from the new hardware. For example, using the earlier example, remote control commands to change the channel would be forwarded to the new external tuner and resulting commands from the new external tuner would be communicated to the display device. While described for HDMI, the technology described herein may be applied to USB ports 304, wirelessly or with any known or future coupling technology without departing from the scope of the technology described herein.

The new hardware 310 may, in some embodiments be configured with media streaming capabilities. For example, the new hardware 310 may provide an internet streaming solution as an add-on to a television. Consequently, the television manufacturer does not need to bear the cost of an internet streaming solution associated with a particular supplier. Alternatively, or in addition to, a consumer may choose from one of many internet access cards and simply plug a selected solution into the display device 108. The internet access card would, in some embodiments, communicate with the new hardware 310 to control access and display of the streaming video and audio signals.

Thus, the new hardware card 310 provides an external hardware upgrade device solution as an add-on to, for example, a television. When a television is purchased by a customer, methods for improving the experience or performance of the TV are generally limited to software only updates. However, the various embodiments described herein provide a technical improvement to the television itself. In addition, the new hardware may, in some embodiments, add new functionality to the television not envisioned by the Original Equipment Manufacturer (OEM) at the time of design or build. The technology described herein overcomes these limitations and therefore solves a problem that exists in the production cycle of existing display devices.

Figure 4:
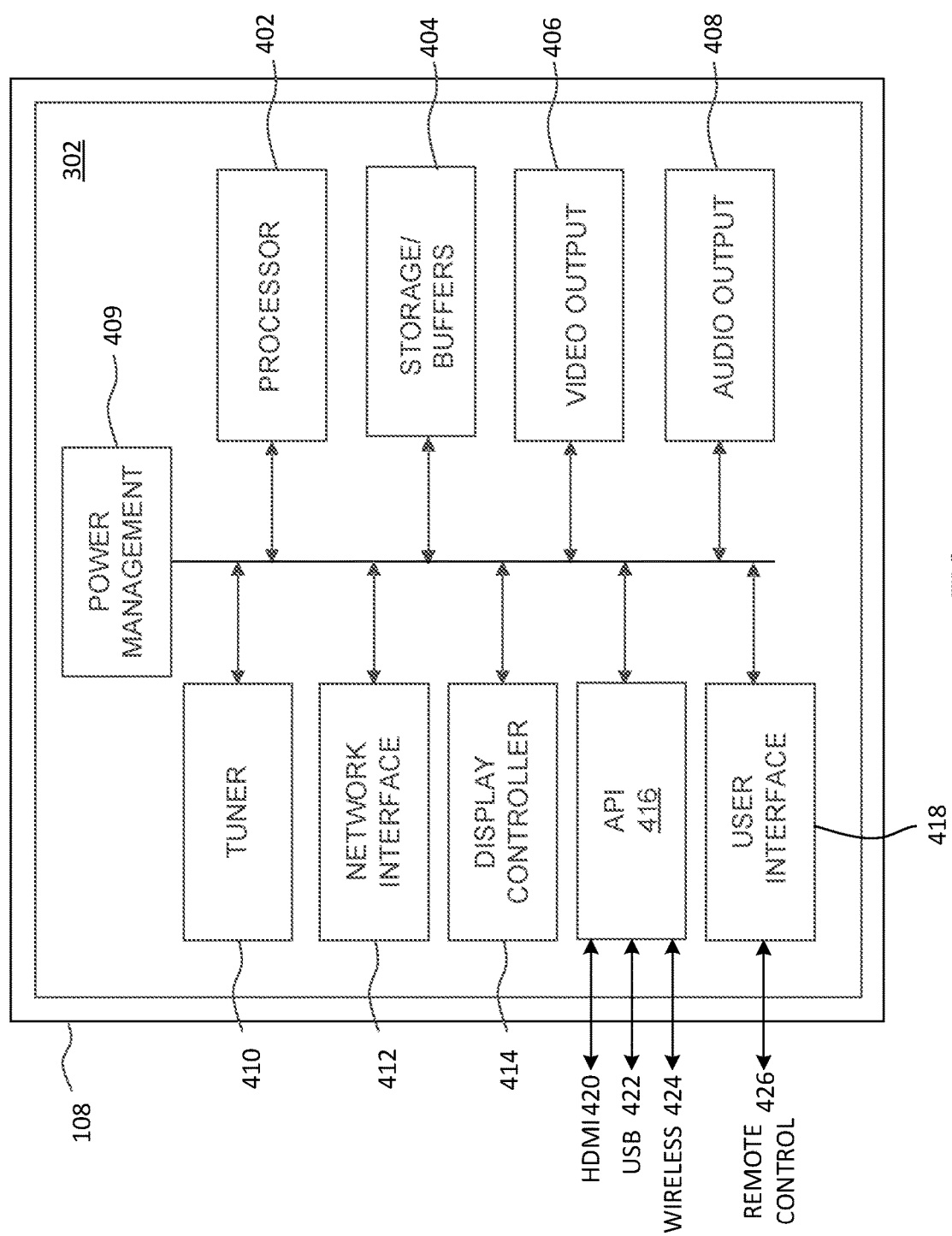
FIG. 4 illustrates a block diagram of an example display device internal configuration, according to some embodiments.

FIG. 4 is a block diagram of original hardware 302 for display device 108, according to some embodiments. Original hardware 302 may be implemented by processing logic (e.g., processor 402) that can comprise hardware (e.g., circuitry, dedicated logic, programmable logic, microcode, etc.), software (e.g., instructions executing on a processing device) stored in storage/buffers 404, or a combination thereof. It is to be appreciated that not all components may be needed to perform the disclosure provided herein as will be understood by a person of ordinary skill in the art.

The display device 108 is configured to include, for example, an external card bay electrical interface with physical card or cable connector receiving sections or ports (e.g., HDMI 420, USB 422, Audio/Video components, optical connectors, or coaxial connectors). In addition, the external card bay electrical interface may communicate with internal device interface 416 that may include circuitry and software components. For example, device interface 416 (e.g., television interfaces) may include various encoding and decoding components to communicate video, audio, control and network signals as is known to one skilled in the art and therefore will not be described in greater detail herein.

In addition, original hardware 302 may communicate wirelessly 424 with one or more external devices. The processor 402 may be connected to a network interface 412, such as, a WiFi circuit, which may include one or more antennas. The WiFi circuit supports wireless communications 424, with for example, a wireless router. An Ethernet port, not shown, may also be provided, which allows for a hardwired connection to the internet. In various embodiments, one or more of the ports, connectors and interfaces should be exposed to the hardware upgrade 310 when it is inserted or otherwise coupled to the display device 108.

Other inputs for display device 108 may include a tuner 410 (e.g., a high definition television tuner) providing tuning of video and audio signals. A user interface 418 communicates with a remote control 426 (same as 110) that can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 426 wirelessly communicates, through user interface 418, with the media device 106 and/or display device 108 using cellular, Bluetooth, infrared, etc., or any combination thereof. The remote control 426 may include a microphone, as previously described. A display controller 414 operates under the control of the processor 402 to select an audio/visual signal input. The processor 402 performs standard functions to produce a video output 406 and an audio output 408 (e.g., through one or more at speakers). The display device 108 also includes a standard power management circuit 409.

The card bay provides a link to the internal electronics of the display device 108. This allows the hardware upgrade 310 to control the display device 108 as further described in various embodiments. The hardware upgrade may be to any or all of the components described in the original hardware. In addition, the one or more components included in the hardware upgrade 310 may be same, upgraded or new, previously unavailable, hardware components. While described for hardware upgrades, the new hardware upgrade 310 may also include same, upgraded or a new operating system (OS). As previously described, hardware upgrade may also implement video and audio streaming technology.

FIG. 5A-5D collectively illustrate a plurality of configurations for display device software layers (i.e., software stack) for internal and external hardware. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all components may be needed to perform the disclosure provided herein. Further, some of the components may be performed simultaneously, or in a different order than described for FIG. 5A-5D, as will be understood by a person of ordinary skill in the art.

Figure 5B:
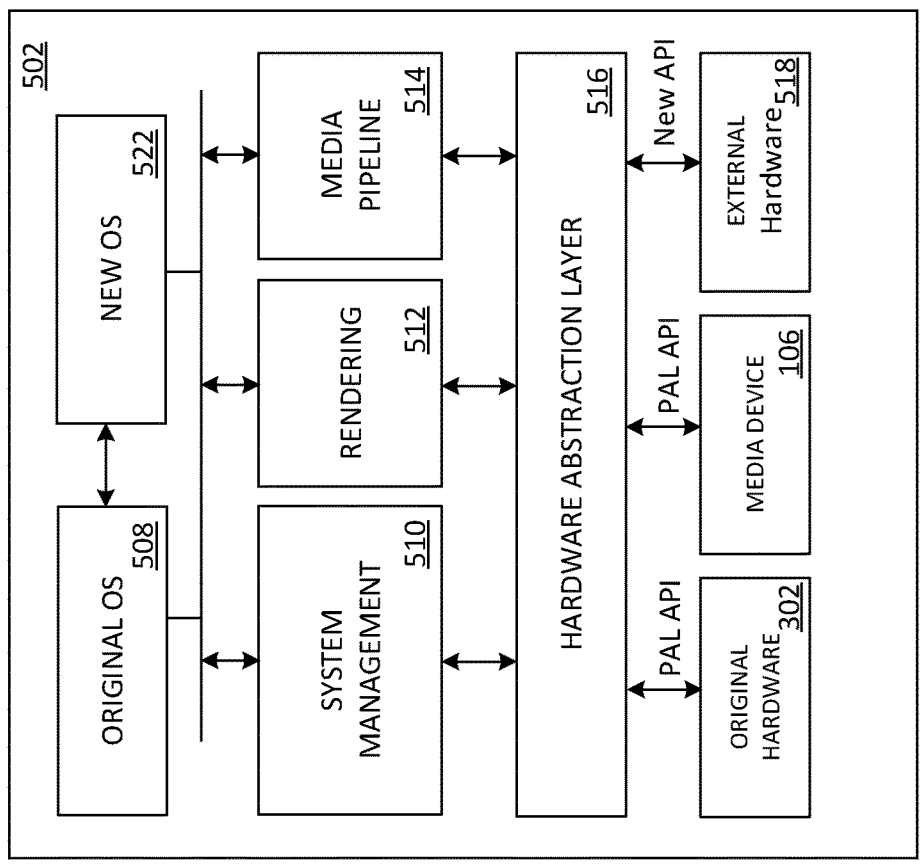
FIG. 5B illustrates a block diagram of a display device with a hardware upgrade device replacing existing hardware components, according to some embodiments.
Figure 5A:
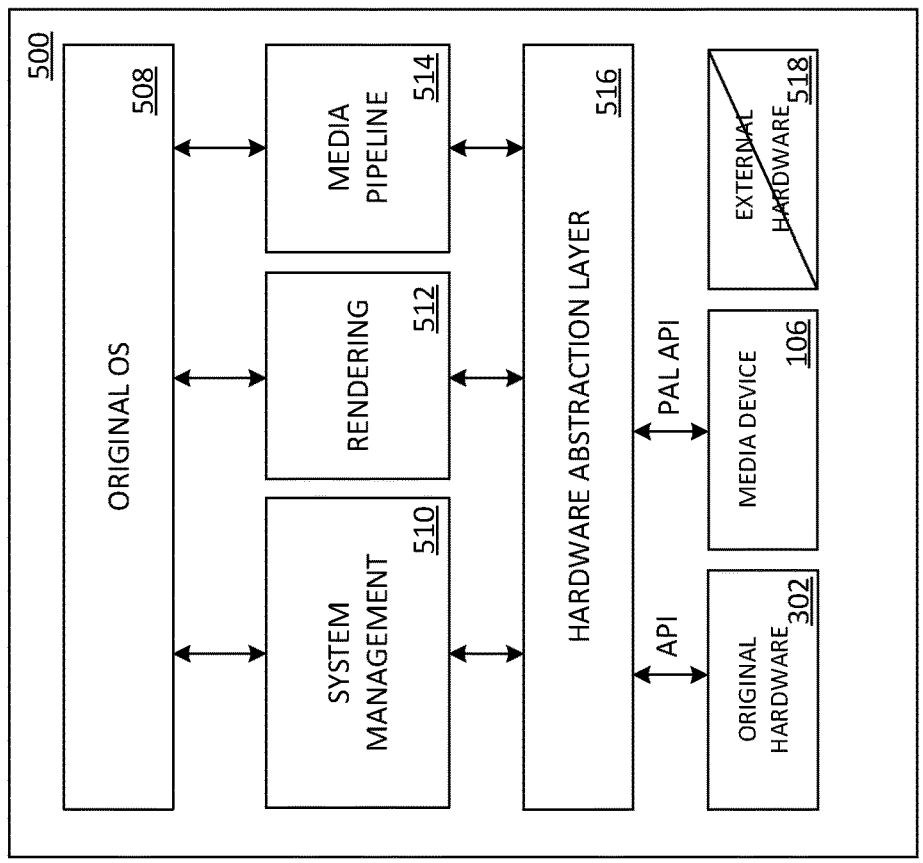
FIG. 5A illustrates a block diagram of a display device with a hardware upgrade device not yet operative with the display device, according to some embodiments.

FIG. 5A illustrates a block diagram of one non-limiting example embodiment where a display device 108 has yet to initiate operational functionality with an external hardware upgrade. In this example embodiment, the software layers are functional for existing original hardware 302. For example, the external hardware may not be connected or may be connected, but may not have initiated or completed a process to take existing control or data functionality for one or more original hardware components. In this configuration, an original operating system (OS) 508 provides instructional processing and control of display and audio functionality of the display device 108. The original OS will be stored in storage 404 and be processed by processor 402. For example, a TV operating system makes it possible for a user to access and control advanced features and connected devices. The TV operating system allows a user to browse not just channels on satellite or cable TV, but also on demand video services. The system also provides access pictures, music or video content on connected storage devices or streams. The TV operating systems may be open or closed source.

System Management 510 provides configuration, monitoring and performance management of the display device. The system management provides management across the display device 108 delivery infrastructure. For example, the system management may aggregate data from various sources such as devices, network applications and integrated third party applications.

Rendering component 512 generates images or motion pictures from video data. In one embodiment, the video data is streamed to the display device, stored in storage/buffers 404, and provided to the display screen through display drivers. Rendering component 512 may be driven by processor 402 or be processed by a stand-alone graphics engine (not shown). Graphics pipelines, found in most graphics processing units (GPUs), which consist of multiple arithmetic units, or complete CPUs, implement the various stages of common rendering operations (perspective projection, window clipping, color and light calculation, rendering, etc.).

Media pipeline 514 may organize and order a sequence of video and audio to be rendered on the display screen and output from built-in or external sound sources (e.g., speakers). Buffering may be needed between the media receiving and playing stages as download speeds and quality may vary, or when media items may be created, lost or destroyed along the media pipeline. Buffering may also be needed to accommodate irregularities in the rates at which the application feeds items to the rendering stage and the rate at which the media is consumed (displayed).

Hardware abstraction layers 516 are sets of routines in software that provide programs with access to hardware resources through programming interfaces. The programming interface allows devices in a particular class of hardware devices to be accessed through identical interfaces even though they may contain different subclasses of devices that each provide a different hardware interface. The hardware abstraction layer resides above the application programming interface (API) in a software stack, whereas the application layer (often written in a high level language) resides above the API and communicates with the hardware by calling functions in the API.

Hardware abstraction layers 516 often allow programmers to write device-independent, high performance applications by providing standard operating system (OS) calls to hardware. The process of abstracting pieces of hardware is often done from the perspective of a CPU. Each type of CPU has a specific Instruction Set Architecture (ISA). The ISA represents the primitive operations of the machine that are available for use by assembly programmers and compiler writers. The same type of abstraction may be made in operating systems, but OS APIs now represent the primitive operations of the machine, rather than an ISA. This allows a programmer to use OS-level operations (e.g. task creation/deletion) in their programs while retaining portability over a variety of different platforms.

Original hardware 302 has been previously described in association with FIG. 4. The original hardware 302 may include the components as described in FIG. 4 or may include more or less components (e.g., tuner, interfaces, processor(s), internal controller(s), storage, buffers, and video or audio I/O, et al.) based on the display device design. An API exposes the original hardware 302 to the upper layers to realize communication of data and commands.

Media device 106 may be configured as peripheral equipment to the display device. 108. Media device 106 may be a streaming media device, DVD or BLU-RAY device, audio/video playback device, cable box, and/or digital video recording device, to name just a few examples. Display device 108 may be a monitor, television (TV), computer, touch screen, smart phone, tablet, wearable (such as a watch or glasses), virtual reality (VR) headset, appliance, internet of things (IoT) device, automotive display, gaming display, heads-up display (HUD), and/or projector, to name just a few examples. In some embodiments, media device 106 can be a part of, integrated with, operatively coupled to, and/or connected to its respective display device 108. As media device 106 acts as a peripheral to the display device 108, a PAL API exposes the media device 106 to the upper layers to realize communication of data and commands.

As shown, external hardware 518 is not yet operational with the display device original hardware. For example, the external hardware has yet to expose one or more replacement or upgrade hardware components to the hardware abstraction layer through an API. External hardware 518 may be configured with one or more replacement, upgraded components or new components not part of the original hardware as previously shown and described in association with FIG. 4. For example, a new tuner may represent an upgrade to an original tuner based on any of, but not limited to, performance, features, encoding/decoding mechanisms, drivers, interfaces, etc.

FIG. 5B illustrates a block diagram of one non-limiting example embodiment where a display device 108 has one or more original hardware 302 components replaced by one or more external hardware components 518 (same as 310). In this exemplary embodiment, the external hardware includes one or more upgraded components to directly replace the original hardware component. Alternatively, or in addition to, in a repair scenario, the external hardware component may replace the existing component with an operational replacement, but not be an upgrade.

In this example embodiment, the external hardware 518 is connected by a ported connection or wireless interface. The connection establishes communication between the internal and external hardware devices. In this connected configuration, the software layers are functional for both the existing original hardware 302 as well as any replacement components that are part of external hardware 518. External hardware upgrade 518 initiates operational functions with hardware and software of display device 108 by importing a hardware configuration and one or more of the internal hardware settings of the original hardware 302. For example, the external hardware may import all original hardware settings or only import settings for an external hardware upgrade component. The original hardware settings may include, but not be limited to, picture settings, audio settings, network configurations, display drivers, buffer size, download bitrates, display hardware refresh rates, audio and video sources (e.g., peripherals or data streaming sources), interface configurations, etc.

In this configuration, an original operating system (OS) 508 may provide instructional control of display and audio functionality of the display device 108. The original OS will be stored in storage 404 and be processed by processor 402. Alternatively, or in addition to, a new OS 522 stored on computer memory within external hardware 518, may provide instructional control of one or more tasks of the original hardware, the external hardware 518 or both. For example, the new OS may acquire task responsibility for WiFi processing.

Original hardware 302 has been previously described in association with FIG. 4. The original hardware 302 may include the components as described in FIG. 4 or may include more or less components (e.g., tuner, interfaces, processor(s), internal controller(s), storage, buffers, and video or audio I/O, et al.) based on the display device design. However, in this configuration, the original hardware acts as a peripheral to the external hardware 518. As such, the API exposing the original hardware 302 to the upper layers to realize communication of data and commands is modified with a PAL API. Commands received by the original hardware are forwarded or rerouted to the external hardware new API. More specifically, commands intended for an original internal hardware component are rerouted to the replacement hardware component of external hardware 518. Rerouting is implemented as calls from the external hardware 518 or as pushes from the original hardware. For example, hardware abstraction layers 516 provide operating system (OS) calls to the new replacement hardware component. Calls may include, but are not limited to remote control inputs (voice or key clicks), hardware events, audio return channels, Cable TV (CATV) information, tuner requests, data streaming requests, etc. The commands may include hardware abstraction messages from the internal controller.

In one non-limiting example, the external hardware may recognize, based on an internal display device platform configuration, an internal controller within the internal display device platform, wherein the internal controller is configured to render media content on the display device based on display device commands. The internal controller may be implemented with a host controller interface (HCI) and receiving control of the internal controller is based on enabling a USB host controller for the HCI.

The external hardware receives, from the internal controller, display device commands bound for the internal display device platform. The hardware configuration settings may include, but not be limited to, picture settings, audio settings, network configurations, display drivers, buffer size, download bitrates, display hardware refresh rates, audio and video sources (e.g., peripherals or data streaming sources), interface configurations, etc. The display device commands may be rerouted to the external hardware based on a push instruction from the display device or based on a call instruction from the external hardware.

Media device 106 may be configured as peripheral equipment to the display device. 108. Media device 106 may be a streaming media device, DVD or BLU-RAY device, audio/video playback device, cable box, and/or digital video recording device, to name just a few examples. Display device 108 may be a monitor, television (TV), computer, touch screen, smart phone, tablet, wearable (such as a watch or glasses), virtual reality (VR) headset, appliance, internet of things (IoT) device, automotive display, gaming display, heads-up display (HUD), and/or projector, to name just a few examples. In some embodiments, media device 106 can be a part of, integrated with, operatively coupled to, and/or connected to its respective display device 108. As media device 106 acts as a peripheral to the display device 108, a PAL API exposes the media device 106 to the upper layers to realize communication of data and commands. External hardware 518 may communicate and control the media device as a peripheral using, for example, a Consumer Electronics Control (CEC) capability over a bi-directional communications channel through interface 308.

As shown, external hardware 518 is operational with the display device original hardware. For example, the external hardware exposes one or more replacement or upgrade hardware components to the hardware abstraction layer 516 through a new API. The one or more replacement or upgrade hardware components take over task responsibilities for the original hardware component without a user having to provide any additional inputs other than plugin the new stick, card or connect to the new hardware wirelessly.

Figure 5D:
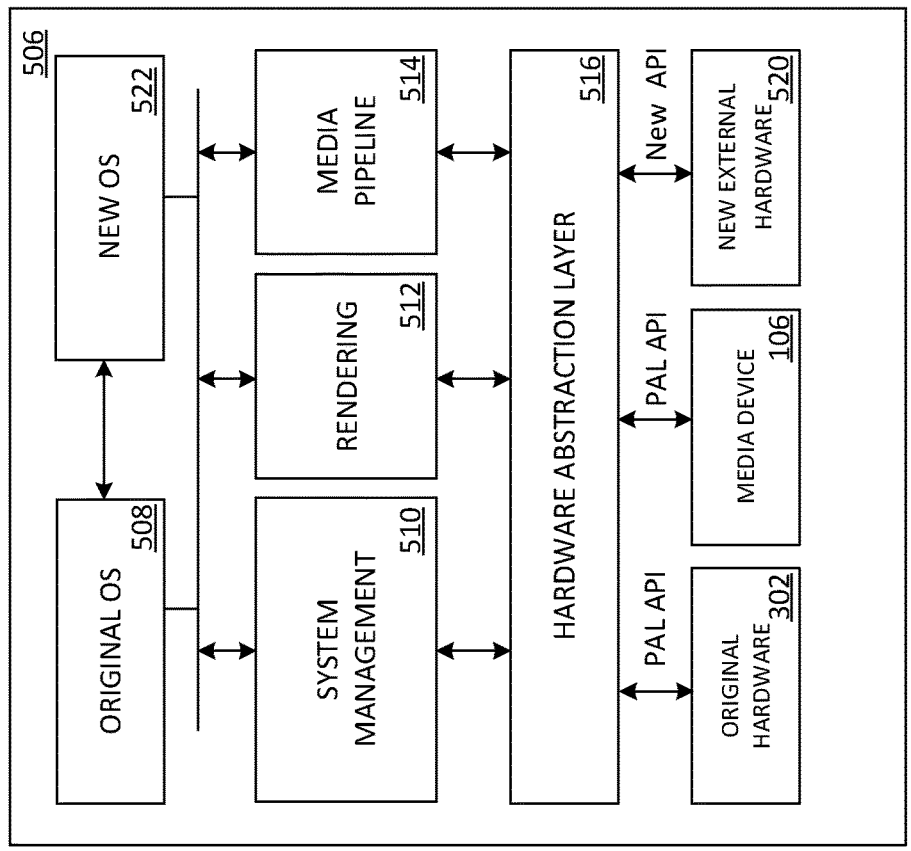
FIG. 5D illustrates a block diagram of a display device with a hardware upgrade device adding new functionality, according to some embodiments.
Figure 5C:
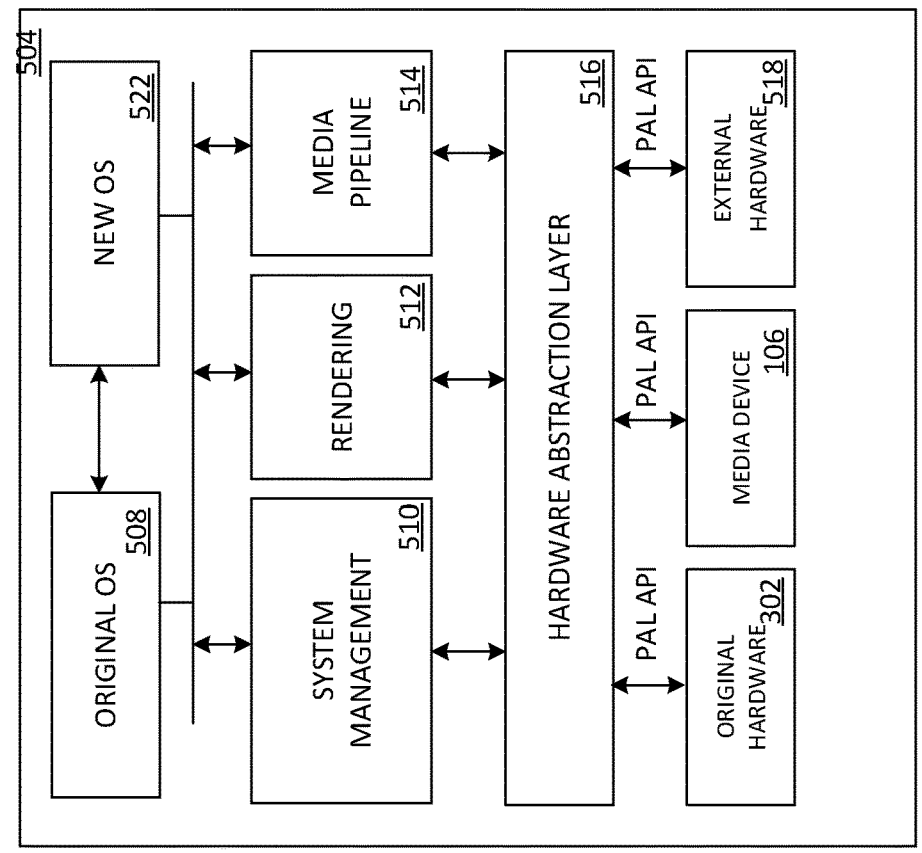
FIG. 5C illustrates a block diagram of a display device with a hardware upgrade device operating with existing hardware, according to some embodiments.

FIG. 5C illustrates a block diagram of one non-limiting example embodiment where a display device 108 original hardware 302 shares operational functionality with an external hardware upgrade. In this example embodiment, the external hardware includes one or more upgraded components to share responsibilities with an original hardware component. In a non-limiting example, the external hardware component is an upgraded WiFi component and the original and external component share processing responsibilities for the display device.

In this example embodiment, the external hardware 518 is connected by a ported connection or wireless interface. The connection establishes communication between the internal and external hardware devices. In this connected configuration, the software layers are functional for both the existing original hardware 302 as well as any replacement components that are part of external hardware 518. External hardware upgrade 518 initiates operational functions with hardware and software of display device 108 by importing one or more of the internal hardware settings of the original hardware 302. For example, the external hardware may import all original hardware settings or only import settings for an external hardware upgrade component. The original hardware settings may include, but not be limited to, picture settings, audio settings, network configurations, display drivers, buffer size, download bitrates, display hardware refresh rates, audio and video sources (e.g., peripherals or data streaming sources), interface configurations, etc.

In this configuration, an original operating system (OS) 508 may provide instructional control of display and audio functionality of the display device 108. The original OS will be stored in storage 404 and be processed by processor 402. Alternatively, or in addition to, a new OS 522 stored on computer memory within external hardware 518, may provide instructional control of one or more tasks of the original hardware, the external hardware 518 or both. For example, the new OS may acquire task responsibility for WiFi processing.

Original hardware 302 has been previously described in association with FIG. 4. The original hardware 302 may include the components as described in FIG. 4 or may include more or less components (e.g., tuner, interfaces, processor(s), internal controller(s), storage, buffers, and video or audio I/O, et al.) based on the display device design. However, in this configuration, the original and new external hardware act as peripherals to the display device 108. As such, the API exposing the original hardware 302 to the upper layers to realize communication of data and commands is modified with a PAL API. Commands received by the original hardware are forwarded or rerouted to the external hardware new API. More specifically, commands intended for an original internal hardware component are rerouted to the shared hardware component of external hardware 518. Rerouting is implemented as calls from the external hardware 518 or as pushes from the original hardware. For example, hardware abstraction layers 516 provide operating system (OS) calls to the new replacement hardware component. Calls may include, but are not limited to remote control inputs (voice or key clicks), hardware events, audio return channels, CATV information, tuner requests, data streaming requests, etc.

Media device 106 may be configured as peripheral equipment to the display device. 108. Media device 106 may be a streaming media device, DVD or BLU-RAY device, audio/video playback device, cable box, and/or digital video recording device, to name just a few examples. Display device 108 may be a monitor, television (TV), computer, touch screen, smart phone, tablet, wearable (such as a watch or glasses), virtual reality (VR) headset, appliance, internet of things (IoT) device, automotive display, gaming display, heads-up display (HUD), and/or projector, to name just a few examples. In some embodiments, media device 106 can be a part of, integrated with, operatively coupled to, and/or connected to its respective display device 108. As media device 106 acts as a peripheral to the display device 108, a PAL API exposes the media device 106 to the upper layers to realize communication of data and commands. External hardware 518 may communicate and control the media device as a peripheral using, for example, a Consumer Electronics Control (CEC) capability over a bi-directional communications channel through interface 308.

As shown, external hardware 518 is operational with the display device original hardware. For example, the external hardware exposes one or more shared hardware components to the hardware abstraction layer 516 as a peripheral through a PAL API. The one or more shared hardware components share one or more task responsibilities for the original hardware component without a user having to provide any additional inputs other than plugin the new stick, card or connect to the new hardware wirelessly.

FIG. 5D illustrates a block diagram of one non-limiting example embodiment where a display device 108 receives new operational functionality with new external hardware 520 that includes one or more new hardware components not previously part of the original hardware. For example, a television with a 4K tuner may not be able to display a new data format (e.g., 128K) when it becomes available. In this embodiment, the external hardware includes one or more new components (e.g., new 128K tuner) to provide new functionality to display device 108.

In this example embodiment, the external hardware 518 is connected by a ported connection or wireless interface. The connection establishes communication between the internal and external hardware devices. In this connected configuration, the software layers are functional for both the existing original hardware 302 as well as any new hardware components that are part of external hardware 518. External hardware 518 initiates operational functions with hardware and software of display device 108 by importing one or more of the internal hardware settings of the original hardware 302. For example, the external hardware may import all original hardware settings or only import settings for an external hardware component. The original hardware settings may include, but not be limited to, picture settings, audio settings, network configurations, display drivers, buffer size, download bitrates, display hardware refresh rates, audio and video sources (e.g., peripherals or data streaming sources), interface configurations, etc.

In this configuration, an original operating system (OS) 508 may provide instructional control of display and audio functionality of the display device 108. The original OS will be stored in storage 404 and be processed by processor 402. In addition, a new OS 522 stored on computer memory within external hardware 518, may provide instructional control of one or more tasks of the original hardware, the external hardware 518 new hardware component or both. For example, the new OS may acquire task responsibility for display drivers for a new display format or standard.

Original hardware 302 has been previously described in association with FIG. 4. The original hardware 302 may include the components as described in FIG. 4 or may include more or less components (e.g., tuner, interfaces, processor(s), internal controller(s), storage, buffers, and video or audio I/O, et al.) based on the display device design. However, in this configuration, the original hardware acts as a peripheral to the external hardware 518. As such, the API exposing the original hardware 302 to the upper layers to realize communication of data and commands is modified with a PAL API. Commands received by the original hardware are forwarded or rerouted to the external hardware new API. More specifically, commands intended for an original internal hardware component are rerouted to the new hardware component of external hardware 518. Rerouting is implemented as calls from the external hardware 518 or as pushes from the original hardware. For example, hardware abstraction layers 516 provide operating system (OS) calls to the new replacement hardware component. Calls may include, but are not limited to remote control inputs (voice or key clicks), hardware events, audio return channels, CATV information, tuner requests, data streaming requests, etc.

Media device 106 may be configured as peripheral equipment to the display device. 108. Media device 106 may be a streaming media device, DVD or BLU-RAY device, audio/video playback device, cable box, and/or digital video recording device, to name just a few examples. Display device 108 may be a monitor, television (TV), computer, touch screen, smart phone, tablet, wearable (such as a watch or glasses), virtual reality (VR) headset, appliance, internet of things (IoT) device, automotive display, gaming display, heads-up display (HUD), and/or projector, to name just a few examples. In some embodiments, media device 106 can be a part of, integrated with, operatively coupled to, and/or connected to its respective display device 108. As media device 106 acts as a peripheral to the display device 108, a PAL API exposes the media device 106 to the upper layers to realize communication of data and commands. External hardware 518 may communicate and control the media device as a peripheral using, for example, a Consumer Electronics Control (CEC) capability over a bi-directional communications channel through interface 308.

As shown, external hardware 518 is operational with the display device original hardware. For example, the external hardware exposes one or more new hardware components to the hardware abstraction layer 516 through a new API, as modified for the new component. The one or more new hardware components implement their associated task responsibilities without a user having to provide any additional inputs other than plugin the new stick, card or connect to the new hardware wirelessly. External hardware 518 may be configured with one or more new components not part of the original hardware as previously shown and described in association with FIG. 4. However, one or more components of the original hardware 302 may be upgraded, replaced by the newly available hardware component features.

FIG. 6 illustrates a flow diagram of the process 600 for replacing, sharing or adding new hardware by adding external hardware for a display device. While described for a display device, the new hardware may be operational for any media device upgrade.

In response to connection of the external hardware to a display device, in 602, the external hardware establishes a communication channel between an interface of the external hardware and an interface of the original internal hardware. For example, in an HDMI connection, external hardware may communicate and control the display device as a peripheral using, for example, a Consumer Electronics Control (CEC) capability over a bi-directional communications channel through an interface.

In 604, after a communication channel has been established (e.g., HDMI CEC), the external hardware automatically requests, from the display device, a hardware configuration of the display device. For example, the external hardware may recognize, based on an internal display device platform configuration, an internal controller within the internal display device platform, wherein the internal controller is configured to render media content on the display device based on display device commands. The hardware configuration settings may include, but not be limited to, picture settings, audio settings, network configurations, display drivers, buffer size, download bitrates, display hardware refresh rates, audio and video sources (e.g., peripherals or data streaming sources), interface configurations, etc.

In 606, the external hardware may request control of the internal controller to redirect internal commands intended for the original hardware to the external hardware. The redirect may be implemented as a push or pull (e.g., call) operation.

In 608, the external hardware receives, from the internal controller, one or more display device commands bound for the internal display device platform. The display device commands may be call operations that include HAL instructions. For example, the external hardware is an upgraded tuner and the external hardware receives remote control commands requests to tune to a new channel.

In 610, the external hardware communicates commands to the display device for operation of one or more hardware components (e.g., internal hardware components, external hardware components or both) for rendering the media data (and outputting associated audio) on the display device.

In 612, the external hardware manages, at least in part, the display device using the commands from the external hardware. For example, using the earlier example, the external tuner directs a media source to display the newly tuned channel video based on an original remote control command to change to that channel. All described video actions may be equally applicable to audio.

While described herein for hardware replacements or upgrades, one or more software functions of an existing display device may be upgraded as well without departing from the scope of the technology described herein.

Example Computer System

Figure 7:
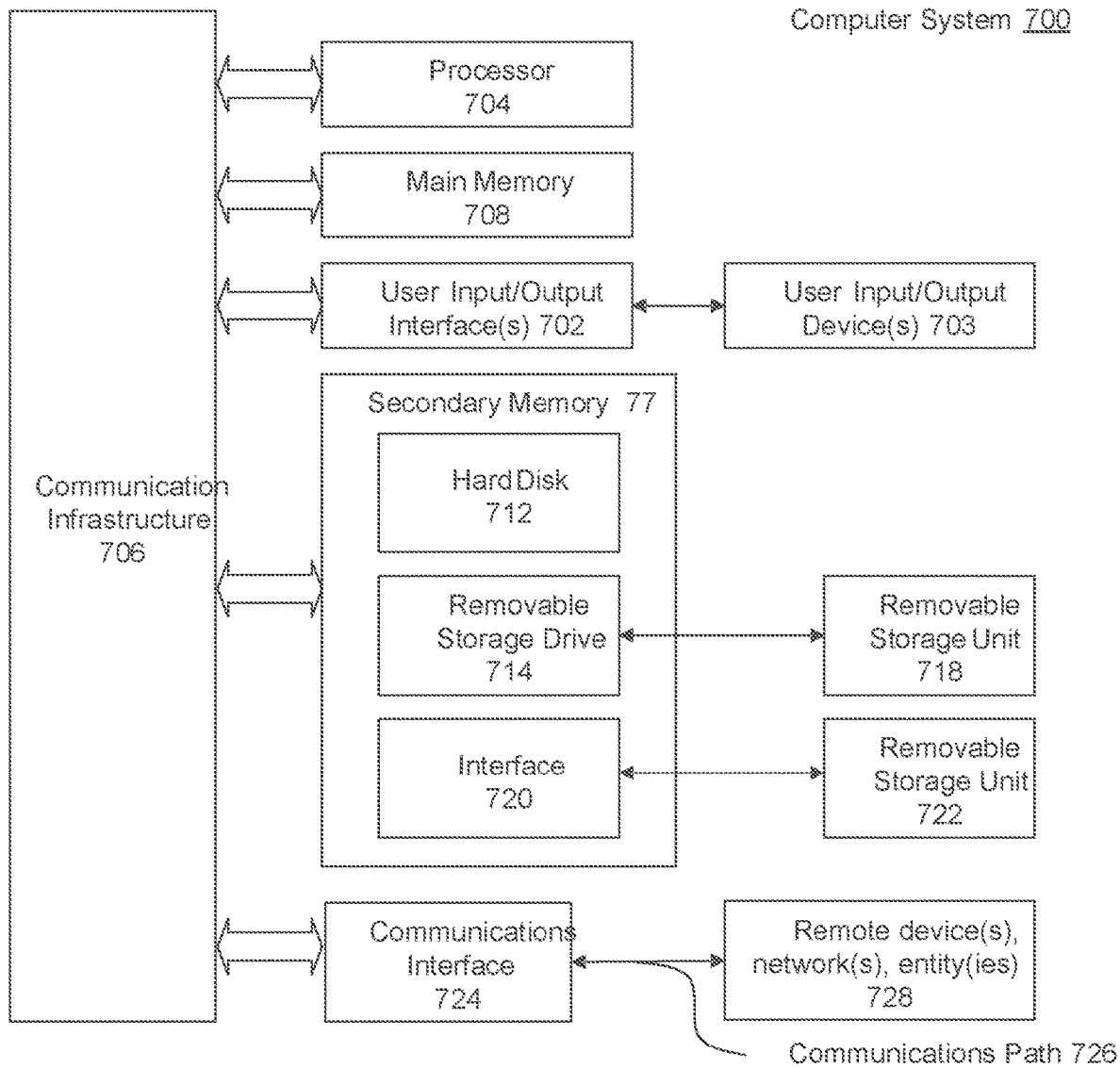
FIG. 7 illustrates an example computer system useful for implementing various embodiments.

Various embodiments may be implemented, for example, using one or more well-known computer systems, such as computer system 700 shown in FIG. 7. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A media device, comprising:
   a memory; and
   one or more processing devices configured to execute instructions from the memory including instructions to:
      request a hardware configuration of internal hardware from a display device;
      recognize, based on the hardware configuration, an internal controller within the display device, wherein the internal controller is configured to render media content on the display device based on display device commands;
      request control of the internal controller;
      redirect, from the internal controller to the media device, a display device command originally bound for the internal hardware based on the control of the internal controller and a hardware call originating from the media device; and
      communicate, to the internal controller and based on the display device command, a media device command based at least in part on a media device hardware component functionality replacing a hardware component of the internal hardware.

2. The media device of claim 1, wherein the display device command includes hardware abstraction messages forwarded from the internal controller.

3. The media device of claim 1, further comprising one or more operating system upgrades to display device resident software operative with the internal hardware.

4. The media device of claim 1, wherein the hardware configuration of the internal hardware further comprises settings of the display device.

5. The media device of claim 1, wherein the display device is a television.

6. The media device of claim 1, further comprising a multimedia interface configured to communicate the display device commands and the media device commands based on a High-Definition Multimedia Interface (HDMI) Consumer Electronics Control (CEC) specification.

7. The media device of claim 6, wherein receiving the control of the internal controller is based on enabling the High-Definition Multimedia Interface (HDMI) Consumer Electronics Control (CEC).

8. The media device of claim 7, wherein the receiving the control of the internal controller is based on automatic enabling of the HDMI CEC based on a connection of the media device to the display device through an HDMI port.

9. The media device of claim 1, further comprising a multimedia interface configured to communicate the display device commands and the media device commands based on a Universal Serial Bus (USB) Consumer Electronics Control (CEC).

10. The media device of claim 9, wherein receiving the control of the internal controller is based on automatic enabling of the USB CEC based on a connection of the media device to the display device through a USB port.

11. The media device of claim 9, wherein the internal controller comprises a host controller interface (HCI) and receiving the control of the internal controller is based on enabling a USB host controller for the HCI.

12. The media device of claim 1, further comprising a wireless multimedia interface configured to wirelessly communicate the display device commands and the media device commands based on a wireless communication specification.

13. The media device of claim 1, wherein the media device hardware component functionality replaces one or more hardware components of the display device internal hardware.

14. A method, comprising:
recognizing, by one or more processors of a display device, connection of an external hardware component upgrade to an internal hardware platform of the display device;
recognizing an internal controller for the internal hardware platform based on internal hardware platform configuration information;
transferring operation of the internal controller to the external hardware component upgrade;
forwarding, from the internal controller to the external hardware component upgrade, first commands bound for the internal hardware platform responsive to the transfer of operation and a hardware call originating from the external hardware component upgrade; and
presenting media content by the display device based, at least in part, on a second command from the external hardware component upgrade, wherein the second command is based at least in part on a function of the external hardware component upgrade.

15. The method of claim 14, wherein the display device further comprises any of: a multimedia interface configured to communicate the first and second commands based on a High-Definition Multimedia Interface (HDMI) Consumer Electronics Control (CEC) specification; a multimedia interface configured to communicate the first and second commands based on a Universal Serial Bus (USB) CEC specification; or a wireless multimedia interface configured to wirelessly communicate the first and second commands based on a wireless communication specification.

16. A media device, comprising:
a memory; and
one or more processing devices configured to execute instructions from the memory including instructions to:
request a hardware configuration of internal hardware from a display device;
recognize, based on the hardware configuration, an internal controller within the display device, wherein the internal controller is configured to render media content on the display device based on display device commands;
request control of the internal controller;
process, from the internal controller, a display device command originally bound for the internal hardware based on the control of the internal controller and a hardware call from the media device; and
communicate, to the internal controller and based on the display device command, media device commands, wherein the media device commands are based, at least in part, on one or more media device hardware components not part of the internal hardware.

17. The media device of claim 16, further comprising any of: a multimedia interface configured to communicate the display device commands and the media device commands based on a High-Definition Multimedia Interface (HDMI) Consumer Electronics Control (CEC) specification; a multimedia interface configured to communicate the display device commands and the media device commands based on a Universal Serial Bus (USB) CEC specification; or a wireless multimedia interface configured to wirelessly communicate the display device commands and the media device commands based on a wireless communication specification.

* * * * *